(12) United States Patent
Ejiri et al.

(10) Patent No.: US 6,497,948 B2
(45) Date of Patent: Dec. 24, 2002

(54) MAGNETIC RECORDING MEDIUM

(75) Inventors: Kiyomi Ejiri, Kanagawa (JP); Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 120 days.

(21) Appl. No.: 09/821,496

(22) Filed: Mar. 29, 2001

(65) Prior Publication Data

US 2002/0015861 A1 Feb. 7, 2002

(30) Foreign Application Priority Data

Mar. 30, 2000 (JP) ........................................ 2000-094616

(51) Int. Cl.$^7$ ................................................. G11B 5/706
(52) U.S. Cl. ........................ 428/323; 428/328; 428/336; 428/694 BA; 428/694 BS; 428/900
(58) Field of Search .................................. 428/323, 328, 428/336, 694 BA, 694 BS, 900

(56) References Cited

U.S. PATENT DOCUMENTS 5,792,543 A * 8/1998 Ejiri et al. .................. 428/141

* cited by examiner

Primary Examiner—Stevan A. Resan
(74) Attorney, Agent, or Firm—Stroock & Stroock & Lavan LLP

(57) ABSTRACT

The present invention aims to provide a particulate magnetic recording medium showing a high C/N in high-density magnetic recording (especially using an MR head for reproducing).

Herein disclosed is a magnetic recording medium comprising a lower layer containing a nonmagnetic powder and a binder provided on a nonmagnetic flexible substrate and a magnetic layer containing a ferromagnetic powder and a binder provided thereon wherein said magnetic layer has an average thickness d of 0.01–0.1 μm, the ferromagnetic powder contained in said magnetic layer is an acicular ferromagnetic alloy powder having an average major axis length of 0.1 μm or less and a as of 120 A.m$^2$/kg (120 emu/g) or less, the nonmagnetic powder contained in said lower layer is an acicular inorganic powder having an average major axis length of 0.15 μm or less, and said ferromagnetic powder has an aspect ratio equal to or smaller than the aspect ratio of said acicular inorganic powder.

16 Claims, No Drawings

MAGNETIC RECORDING MEDIUM

BACKGROUND OF THE INVENTION

1. Field of the Invention

The present invention relates to particulate magnetic recording media for high-density recording.

2. Description of Related Art

Recently, there is a tendency toward shorter recording wavelength with higher densification, resulting in the aggravation of the problem of self-demagnetization loss during recording leading to output loss with a thick magnetic layer. Thus, a thinner magnetic layer has been made, but a magnetic layer of 2 μm or less directly applied on a nonmagnetic substrate are susceptible to the influence of the substrate on its surface to deteriorate electromagnetic characteristics or aggravate dropouts.

A possible solution to this problem was to apply an underlying nonmagnetic layer and a thin layer of a concentrated magnetic coating solution thereon by simultaneous multi layer coating, as disclosed in JP-A Nos. 191315/88 and 187418/88. These inventions dramatically improved the yield to attain good electromagnetic characteristics. In order to achieve a further higher density, magnetoresistive reproducing heads (MR heads) are commercialized in hard discs and experimental reports exist on metal-evaporated tapes (ME) in flexible media (IEEE. trans. mag. VOL. 35, No.2, p. 729 (1999)).

Although magnetic recording media suited to reproduction with MR heads on metal-evaporated tapes (ME) have been examined, any particulate magnetic recording media with good productivity or preservability have not been sufficiently examined.

Therefore, it is an object of this invention to provide a particulate magnetic recording medium showing a high C/N in high-density magnetic recording (especially using an MR head for reproducing).

SUMMARY OF THE INVENTION

Accordingly, the present invention relates to a magnetic recording medium comprising a lower layer containing a nonmagnetic powder and a binder and a magnetic layer containing a ferromagnetic powder and a binder provided on a nonmagnetic flexible substrate in this order wherein said magnetic layer has an average thickness d in the range of from 0.01 to 0.1 μm, said ferromagnetic powder contained in said magnetic layer is an acicular ferromagnetic alloy powder having an average major axis length equal to or less than 0.1 μm and a saturation magnetization as equal to or less than 120 A.m²/kg (120 emu/g), said nonmagnetic powder contained in said lower layer is an acicular inorganic powder having an average major axis length equal to or less than 0.15 μm, and said ferromagnetic powder has an aspect ratio equal to or smaller than the aspect ratio of said acicular inorganic powder.

Preferred embodiments of the magnetic recording medium of the present invention have the following features.

(1) The above-mentioned ferromagnetic alloy powder has an average particle volume in the range of from 1500 to 15000 nm³ and a coercivity Hc equal to or more than 167 KA/m (2100 Oe).

(2) The above-mentioned ferromagnetic powder in said magnetic layer has a volume packing density equal to or more than 30%.

(3) The above-mentioned lower layer contains a granulated powder having an average particle size equal to or less than 50 nm and a true specific gravity equal to or less than 5 in an amount ranging from 10 to 30 parts per 100 parts of the acicular inorganic powder.

DESCRIPTION OF THE PREFERRED EMBODIMENTS

Now, advantageous features of the present invention are briefly explained. The magnetic layer (upper layer) has to have an average thickness of 0.01–0.1 μm in order to improve the C/N and/or resolution in digital recording with an MR head. This is reviewed in reports on experimental results using vapor-deposited tapes (IEEE, trans. mag. VOL. 35, No. 2, p. 729 (1999); Technical Reports by The Institute of Image Information and Television Engineers, VOL. 23, No. 78, p. 21 (1999)).

However, it is difficult to obtain a magnetic layer having a thickness comparable to those of metal thin films in particulate media. Moreover, magnetic recording media using a magnetic alloy powder successfully achieving high performance with a conventional inductive head makes excessive noise during reproduction with an MR head and tend to invite saturation of an MR element to fail in attaining a high C/N. It was now found that a magnetic layer with less magnetic heterogeneousness can be obtained by providing a magnetic layer containing an acicular magnetic alloy powder having relatively small magnetization amount and average major axis length on a lower nonmagnetic layer containing a nonmagnetic powder having an average major axis length of 0.15 μm or less and an aspect ratio greater than that of said acicular magnetic alloy powder.

According to the present invention, a nonmagnetic powder having a greater aspect ratio than that of the ferromagnetic powder is used in the lower nonmagnetic layer to improve flow orientability of the lower layer, whereby the orientation of the fine-grained magnetic material that would be otherwise hard to orient and hard to improve in packing density can be improved and the variation in the thickness of the magnetic layer can be reduced. The relation of the aspect ratio of the upper layer ≦ the aspect ratio of the lower layer is per se known from JP-A Nos. 102037/96 and 106533/97. However, it has not been known that such a nonmagnetic powder is combined with a ferromagnetic alloy powder having a small σs of 120 A.m²/kg (120 emu/g) or less and that this combination produces an unprecedented effect. Thus, a good squareness SQ is obtained by using a lower layer containing a nonmagnetic powder having a high aspect ratio as used herein in combination with a low-σs ferromagnetic powder that tends to be deoriented because of the low thixotropy of the coating solution. It was also found that a lower layer containing a nonmagnetic powder having a greater aspect ratio shows higher moldability during calendering to attain better surface properties during the film-coating step by completing the low moldability of the magnetic layer containing a fine-grained magnetic material having a low void volume.

Said ferromagnetic powder preferably has an average particle volume of 1500–15000 nm³ to reduce noise and an Hc of 167KA/m (2100Oe) or more to stably maintain recording magnetization. If the particle volume is less than 1500 nm³ and the Hc is less than 167 KA/m (2100 Oe) ,heat stability of recording magnetization may be deteriorated. If the particle volume exceeds 15000 nm³, a sufficient C/N may not be obtained because of excessive noise. The average particle volume is 1500–15000 nm³, preferably 2000–12000 nm$^3$, more preferably 3000–10000 nm$^3$. The coercive force Hc is 167 KA/m (2100 Oe) or more and preferably as high as possible from the recording principle, but actually a range of 175–279 KA/m (2200–3500 Oe) is suited in view of the capacity of recording heads.

In the present invention, the packing density of the ferromagnetic powder is also important, i.e. the volume packing density of the ferromagnetic alloy powder in the magnetic layer is suitably 30% or more, preferably 35% or more, more preferably 38% or more to further improve the C/N.

Furthermore, a granulated powder having an average particle size of 50 nm or less and a true specific gravity of 5 or less is contained in said nonmagnetic layer in an amount of 10–30 parts per 100 parts of the acicular nonmagnetic inorganic powder to form gaps between acicular particles in the coating film, whereby moldability can be improved during calendering to give good surface properties.

[Magnetic Layer]

In the present invention, the magnetic layer has an average thickness d of 0.01–0.1 μm, preferably 0.03–0.08 μm. The object of the present invention can be achieved whether the magnetic layer has a single-layer or multi layer structure. In the latter example, techniques as described in JP-A No. 139555/94 can be applied, for example. In the present invention, ideally, the variation in the thickness of the magnetic layer is zero because the relatively thin magnetic layer leads to a saturated recording state. However, some variation is practically acceptable so far as the relation between the standard deviation σ of the thickness of the magnetic layer and d satisfies σ/d≦0.5, more preferably σ/d≦0.3.

Specifically, the σ can be reduced by using a thixotropic nonmagnetic coating solution for the lower layer or using an acicular nonmagnetic powder for the lower layer or applying and drying a lower nonmagnetic layer and then applying an upper magnetic layer by the wet-on-dry process, as described in Japanese Patent No. 2566096. The σ can be reduced by using an acicular nonmagnetic powder having a greater aspect ratio than that of the magnetic material and adding a fine-grained powder having a true specific gravity of 5 or less as defined herein.

The residual magnetization Φr of the magnetic layer is preferably 5–50 mT.μm (50–500 G.μm). The Φr can be optimized in such a range that the MR head used is not saturated. For example, the relation between Φr and saturation magnetization/thickness of MR elements in vapor-deposited tapes is disclosed in JP-A No. 134306/98 or Technical Reports by The Institute of Image Information and Television Engineers, VOL. 23, No. 78, p. 21 (1999). Desirably, particulate media should also satisfy a similar relation. The residual magnetization can be adjusted to the above range by changing the amount of the binder used or the saturation magnetization of the magnetic material used. When the magnetic layer is designed to have a relatively small thickness (for example, 0.05 μm or less) on O/W demands, it is preferable to use an alloy powder having a relatively high σs of 110–120 A.m$^2$/kg (110–120 emu/g) as a magnetic powder.

The magnetic powder used herein may be an alloy powder having a saturation magnetization σs of 120 A.m$^2$/kg (120 emu/g) or less, preferably 80–120 A.m$^2$/kg (80–120 emu/g) more preferably 90–120 A.m$^2$/kg (90–120 emu/g). Suitably, the magnetic powder has an average major axis length of 0.1 μm or less, preferably 0.03–0.08 μm. Suitably, the minor axis length is 0.005–0.02 μm, preferably 0.008–0.015 μm. Suitably, the aspect ratio (major axis length/minor axis length) is 3–15, preferably 5–10.

In addition to specified atoms, the magnetic powder may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B. To improve thermal stability, such atoms as Al, Si, Ta or Y may be deposited or dissolved in solid on the surface. Particularly for obtaining a high Hc, it is well known that Co, Sm, Nd or the like is added at 5–40% by weight of Fe. These magnetic powders may be pretreated with dispersants, lubricants, surfactants, antistatic agents or the like before they are dispersed.

A Binder used in the upper magnetic layer may be one known from Japanese Patent Nos. 2566096 and 2571351, for example. The binder preferably contains a functional group promoting adsorption to a magnetic powder (such as SO$_3$M, PO$_3$M) and preferably further contains an epoxy group. It may has a molecular weight of 10,000–100,000, preferably 20,000–60,000. It is used in an amount of 5–25 parts, preferably 5–20 parts, more preferably 5–15 parts per 100 parts by weight of the magnetic powder.

The magnetic layer may contain known an abrasive such as α-alumina or Cr$_2$O$_3$ having an average particle diameter of ⅓ or more but 5 times or less the thickness of the magnetic layer in the case of wet-on-wet coating or ⅓ or more but twice or less the thickness of the magnetic layer in the case of wet-on-dry coating. Too large particles may cause noise/dropout. Especially for wet-on-dry coating, fine particles are more preferred, because an abrasive tends to grow into projections. As for the pH and surface treatments, known techniques can be applied. The magnetic layer may further contain a solid lubricant (carbons of 30 μm or more in particle diameter) or a liquid lubricant such as fatty acids and esters thereof.

[Nonmagnetic Layer (lower layer)]

The nonmagnetic powder used as a main component in the lower nonmagnetic layer is an acicular powder having an average major axis length of 0.15 μm or less, preferably 0.05–0.15 μm and an aspect ratio equal to or greater than the aspect ratio of the magnetic powder contained in the magnetic layer. The aspect ratio of the nonmagnetic powder in the lower layer is preferably 5–20, more preferably in the range satisfying the relation 0.3 ≦ the aspect ratio of the magnetic material in the upper layer / the aspect ratio of the nonmagnetic powder in the lower layer ≦ 0.9. Especially preferred nonmagnetic powders in the present invention are acicular metal oxides having a pH of 5 or higher. These show good dispersion because of the high absorption to functional groups in binders and provide mechanically strong coating films.

Other preferred features of the nonmagnetic powder include an oil absorption utilizing DBP of 5–100 ml/100 g, preferably 10–80 ml/100 g, more preferably 20–60 ml/100 g, a specific gravity of 1–12, preferably 3–6, and an ignition loss of 20% by weight or less.

These nonmagnetic powders used in the present invention preferably have a Mohs hardness of 4 or more. The roughness factor on the surfaces of these powders is preferably 0.8–1.5, more preferably 0.9–1.2. The stearic acid (SA) absorption is 1–20 μmol/m$^2$, more preferably 2–15 μmol/m$^2$. The wetting heat of the nonmagnetic inorganic powder in the lower layer in water at 25° C. is preferably in the range of 20–60 μJ/cm$^2$ (200 erg/cm$^{2-600}$ erg/cm$^2$). Suitable solvents also have this wetting heat range. Suitably, 1 to 10 water molecules/100 angstroms are present on the surface at 100–400° C.

The pH of the isoelectric point in water is preferably between 5 and 10.

The surfaces of these powders are preferably treated with $Al_2O_3$, $SiO_2$, $TiO_2$, $ZrO_2$, $SnO_2$, $Sb_2O_3$ or ZnO. Especially preferred for dispersibility are $Al_2O_3$, $SiO_2$, $TiO_2$ or $ZrO_2$. These may be used in combination or alone to form a surface-coating layer by coprecipitation or depositing alumina at first and then silica on the surface or vice versa depending on the purpose. The surface-coating layer may be a porous for some purposes, but preferably homogeneous and dense in general. These acicular powders include oxides such as $TiO_2$, hematite, α-alumina, γ-alumina, $ZrO_2$, $CeO_2$, $Cr_2O_3$ and $Sio_2$ or nonmagnetic metals.

In addition to said acicular nonmagnetic powder, the lower layer preferably contains a granulated powder having an average particle size of 50 nm or less, preferably 40 nm or less and a true specific gravity of 5 or less in an amount of 5–30 parts per 100 parts of said acicular nonmagnetic powder. Examples of the granulated powder include oxides such as $TiO_2$, hematite, alumina, $ZrO_2$, $CeO_2$, $Cr_2O_3$ and $SiO_2$, nonmagnetic metals, organic resin fillers, carbon blacks, etc. Especially preferred is a carbon black having an average particle size of 30 nm or less.

A binder used in the lower layer may be the same as used in the upper magnetic layer. However, it is more preferred that they contain a functional group promoting dispersion (see supra) and have a molecular weight of 20,000–50,000, preferably 30,000–50,000. If the molecular weight is too high, calendering moldability tends to be deteriorated. More effectively, the nonmagnetic powder is surface-treated with alumina or an aromatic phosphorus compound for promoting dispersion.

For details, see Japanese Patent Nos. 2566088 and 2634792.

Suitably, the lower layer has a thickness of 0.3–3 µm, preferably 0.5–2 µm.

The upper and lower layers of the present invention may contain a polyisocyanate as mentioned below as a binder.

Suitable polyisocyanates include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate; products of these isocyanates with polyalcohols; or polyisocyanates produced by condensation of isocyanates. These isocyanates are commercially available under trade names Coronate L, Coronate HL, Coronate 2030, Coronate 2031, Millionate MR and Millionate MTL from Nippon Polyurethane Industry Co. Ltd.; Takenate D-102, Takenate D-110N, Takenate D-200 and Takenate D-202 from Takeda Chemical Industries, Ltd.; Desmodule L, Desmodule IL, Desmodule N and Desmodule HL from Sumitomo Bayer Urethane Co., Ltd. etc., which may be used alone or as a combination of two or more of them by taking advantage of the difference in curing reactivity in both nonmagnetic and magnetic layers.

Examples of carbon blacks used in the upper layer of the present invention include furnace blacks for rubber use, thermal blacks for rubber use, carbon blacks for coloring agents, acetylene blacks or the like. They preferably have a specific surface area of 5–500 $m^2/g$, a DBP oil absorption of 10–400 ml/100 g, a particle diameter of 5 µm–300 µm, a pH of 2–10, a moisture content of 0.1–10 % by weight and a tap density of 0.1–1 g/ml. Specific examples of carbon blacks used in the present invention include BLACKPEARLS 2000, 1300, 1000, 900, 800, 700 and VULCAN XC-72 manufactured by Cabot Corporation; 190 80, #60, #55, #50 and #35 manufactured by Asahi Carbon Co., Ltd.; #2400 B, #2300, #900, #100, #30, #40 and #10 B manufactured by Mitsubishi Chemical Corporation; and CONDUCTEX SC, RAVEN 150, 50, 40 and 15 manufactured by Columbian Chemicals Company. These carbon blacks may be surface-treated with a dispersant or grafted with a resin or partially graphitized on their surfaces. Alternatively, they may be dispersed in a binder before they are added to a magnetic coating. These carbon blacks can be used alone or in combination.

When a carbon black is used, it preferably represents 0.1–30% by weight of the amount of the ferromagnetic powder.

Carbon blacks have an antistatic effect, friction coefficient-lowering effect, light protection-conferring effect, film strength-improving effect or the like on the magnetic layer depending on the carbon blacks specifically used. Therefore, these carbon blacks used in the present invention can obviously vary in nature, amount and combination from upper magnetic to lower layers to meet the purpose on the basis of the characteristics shown above such as particle size, oil absorption, conductivity or pH. As for a carbon black that can be used in the magnetic layer of the present invention, see "Carbon Black Handbook" edited by Carbon Black Association, for example.

Suitable abrasives for use in the present invention are typically known materials having a Mohs hardness of 6 or more such as α-alumina having an α-conversion degree of 90% or more, β-alumina, silicon carbide, chromium oxide, cerium oxide, α-iron oxide, corundum, artificial diamond, silicon nitride, silicon carbide, titanium carbide, titanium dioxide, silicon dioxide and boron nitride, which can be used alone or in combination. Complexes of these abrasives may also be used (which are obtained by surface-treating one abrasive with another abrasive). These abrasives may sometimes contain other compounds or elements than main components, but the effect is not affected so far as main components represent 90% by weight or more. Abrasives preferably have a tap density of 0.3–2 g/ml, a moisture content of 0.1–5% by weight, a pH of 2–11 and a specific surface area of 1–30 $m^2/g$. Abrasives used in the present invention may have any of acicular, spherical and cubic shapes, but preferably have a partially angular shape to provide high abrasive properties. Specific examples of abrasives used in the present invention include AKP-20, AKP-30, AKP-50, HIT-50 and HIT-100 manufactured by Sumitomo Chemical Co., Ltd.; G5, G7 and S-1 manufactured by Nippon Chemical Industrial Co.,Ltd.; and TF-100 and TF-140 manufactured by Toda Kogyo K.K. Abrasives used in the present invention can obviously vary in nature, amount and combination from (upper and lower) magnetic to nonmagnetic layers to meet the purpose. These abrasives maybe preliminarily dispersed in a binder before they are added into a magnetic coating.

Additives used in the present invention have a lubricating effect, antistatic effect, dispersing effect, plasticizing effect or the like. Suitable additives include molybdenum disulfide; tungsten-graphite disulfide; boron nitride; graphite fluoride; silicone oils; silicones having a polar group; fatty acid-modified silicones; fluorine-containing silicones; fluorine-containing alcohols; fluorine-containing esters, polyolefins; polyglycols; alkyl phosphoric acid esters and alkali metal salts thereof; alkyl sulfuric acid esters and alkali metal salts thereof; polyphenyl ethers; fluorine-containing alkyl sulfuric acid esters and alkali metal salts thereof; C10–24 monobasic fatty acids optionally branched and optionally containing an unsaturated bond and metal (e.g., Li, Na, K, Cu) salts thereof; C12–22 monohydric, dihydric, trihydric, tetrahydric, pentahydric and hexahydric alcohols optionally branched and optionally containing an unsaturated bond; C12–22 alkoxy alcohols optionally branched and optionally containing an unsaturated bond; monofatty acid esters or difatty acid esters or trifatty acid esters formed from a C10–24 monobasic fatty acid optionally branched and optionally containing an unsaturated bond and any one of C2–12 monohydric, dihydric, trihydric, tetrahydric, pentahydric and hexahydric alcohols optionally branched and optionally containing an unsaturated bond; fatty acid esters of monoalkyl ethers of alkylene oxide polymers; C8–22 fatty acid amides; and C8–22 aliphatic amines.

Specific examples of these additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Other suitable additives include nonionic surfactants based on alkylene oxides, glycerin, glycidol or alkyl phenol-ethylene oxide adducts; cationic surfactants based on cyclic amines, ester amides, quaternary ammonium salts, hydantoin derivatives, heterocycles, phosphonium or sulfoniums; anionic surfactants containing an acidic group such as carboxylate, sulfonate, phosphate, sulfuric and phosphoric acid ester groups; and ampholytic surfactants based on amino acids, amino sulfonic acids, sulfuric or phosphoric acid esters of amino alcohols or alkyl betaines.

These surfactants are described in detail in "Surfactants Handbook" (published by Sangyo Tosho Co., Ltd.). These lubricants, antistatic agents or the like need not be 100% pure but may contain impurities such as isomers, unreacted materials, side reaction products, decomposition products and oxides in addition to main components. The content of these impurities is preferably 30% or less, more preferably 10% or less.

These lubricants and surfactants used in the present invention can vary in nature and amount from lower to upper magnetic layers, if desired. For example, fatty acids having different melting points or esters having different boiling points or polarities can be used in the lower and upper magnetic layers to control bleed-through, or the amount of surfactants can be controlled to improve coating stability, or the amount of lubricants added to the nonmagnetic layer can be increased to improve a lubricating effect, though these examples are not limitative as a matter of course. Additives used in the present invention may be totally or partially added in any step of the preparation process of magnetic coatings. For example, they may be mixed with the ferromagnetic metal powder before kneading, or may be added during the step where the ferromagnetic metal powder, binders and solvents are kneaded, or may be added during or after dispersion, or may be added immediately before coating. For some purposes, additives may be partially or totally applied by simultaneous or sequential coating after the magnetic layer has been applied. For other purposes, lubricants may be applied on the surface of the magnetic layer after completion of calendering or slitting.

Commercial products of these lubricants used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173 K, Hydrogenated Castor Oil Fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20 R, Nonion PP-40 R, Nonion SP-60 R, Nonion OP-80 R, Nonion OP-85 R, Nonion LT-221, Nonion ST-221, Nonion TO-221, Monogly MB, Nonion DS-60, Anon BF, Anon LG, Butyl Stearate, Butyl Laurate and Erucic Acid manufactured by NOF Corporation; Oleic Acid manufactured by Kanto Chemical Co., Ltd.; FAL-205 and FAL-123 manufactured by Takemoto Oil & Fat Co., Ltd.; NJLUB LO, NJLUB IPM and Sansosyzer E4030 manufactured by New Japan Chemical Co., Ltd.; TA-3, KF-96, KF-96 L, KF96 H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co., Ltd.; Armid P, Armid C and Armoslip CP manufactured by Lion Armour Co., Ltd.; Duomine TDO manufactured by Lion Corporation; BA-41 G manufactured by Nisshin Oil Mills, Ltd.; Profan 2012 E, Newpol PE61, Ionet MS-400, Ionet MO-200, Ionet DL-200, Ionet DS-300, Ionet DS-1000 and Ionet DO-200 manufactured by Sanyo Chemical Industries, Ltd.

Organic solvents used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane, which may be used in any ratio. These organic solvents need not be 100% pure but may contain impurities such as isomers, unreacted materials, side reaction products, decomposition products, oxides and moisture in addition to main components. The content of these impurities is preferably 30% or less, more preferably 10% or less. Organic solvents used in the present invention are preferably the same type in the magnetic and nonmagnetic layers, but may be added in varying amounts. A solvent having a high surface tension such as cyclohexane or dioxane is used in the nonmagnetic layer to increase coating stability, and more specifically, it is important that the arithmetic mean of solvent compositions in the upper layer is not less than the arithmetic mean of solvent compositions in the lower layer. Somewhat high polarity is preferred to improve dispersion, so that solvent compositions preferably contain 50% or more of solvents having a permittivity of 15 or more. The dissolution parameter is preferably 8–11.

The nonmagnetic flexible substrate of magnetic recording media of the present invention suitably has a thickness of 1–100 $\mu$m, preferably 3–80 $\mu$m. An undercoat layer may be inserted between the nonmagnetic flexible substrate and the lower layer to improve adhesion. The undercoat layer suitably has a thickness of 0.01–2 $\mu$m, preferably 0.02–0.5 $\mu$m. A back coat layer may be provided on the side of the nonmagnetic substrate opposite to the magnetic layer. The back coat layer suitably has a thickness of 0.1–2 $\mu$m, preferably 0.3–1.0 $\mu$m. Known materials can be used as these undercoat layer and back coat layer.

Suitable nonmagnetic flexible substrates for use in the present invention may be known films made of polyesters such as polyethylene terephthalate, polyethylene naphthalate; polyolefins; cellulose triacetate; polycarbonates; polyamides; polyimides; polyamides-imides; polysulfons; aramids; aromatic polyamides, etc.

These substrates may be pretreated by corona discharge treatment, plasma treatment, adhesion-enhancing treatment, heat treatment, dust removal or the like.

Nonmagnetic substrates used in the present invention in the case of a tape have a Young's modulus in MD of 3.92–14.7 GPa (400–1500 kg/mm$^2$), preferably 4.9–12.75 GPa (500–1300 kg/mm$^2$) and a Young's modulus in TD of 4.9–19.6 GPa (500–2000 kg/mm$^2$), preferably 6.9–17.6 GPa (700–1800 kg/mm$^2$) with the TD/MD ratio being ⅕–⅕, preferably ⅕–⅓.

The thermal shrinkage of substrates in the tape running direction and width direction is preferably 3% or less, more preferably 1.5% or less at 100° C. for 30 minutes, or preferably 1% or less, more preferably 0.5% or less at 80° C. for 30 minutes. The break strength in both directions is preferably 5–100 kg/mm$^2$.

The process for preparing magnetic coatings of magnetic recording media of the present invention comprises at least a kneading step, a dispersing step and a mixing step optionally added before or after the former steps. Each step may be separated into two or more stages. All the materials used in the present invention such as ferromagnetic powders, binders, carbon blacks, abrasives, antistatic agents, lubricants and solvents may be added at the beginning of or during any steps. Moreover, divided portions of each material may be added in two or more steps. For example, divided portions of polyurethane may be added at the kneading step, the dispersing step, and the mixing step for controlling viscosity after dispersion.

Although it is a matter of course that known manufacturing techniques can be applied as a part of the process to achieve the object of the present invention, the high residual magnetic flux densities (Br) of magnetic recording media of the present invention could be first obtained by using an apparatus having a high kneading power such as a continuous kneader or a pressure kneader. When a continuous kneader or a pressure kneader is used, the ferromagnetic powder is kneaded with all or a part of binders (preferably 30% or more of the total binders) in the range of 15–500 parts by weight per 100 parts by weight of the ferromagnetic metal powder. The details of these kneading processes are described in JP-A No. 106338/89 and 79274/89. For preparing a solution for the lower nonmagnetic layer, it is desirable to use dispersion media having a high specific gravity, preferably zirconia beads.

The following structures can be proposed as examples of the apparatus and method for applying a multilayer magnetic recording medium as disclosed herein.

(1) The lower layer is initially applied using a coater commonly used for magnetic coating such as a gravure coater, roller coater, blade coater or extrusion coater, and the upper layer is then applied using a substrate-pressurizing extrusion coater disclosed in JP-B No. 46186/89 and JP-A Nos. 238179/85 and 265672/90 while the lower layer is still wet.

(2) The upper and lower layers are applied almost simultaneously using a single coating head having two slits for passing coating solutions as disclosed in JP-A Nos. 88080/88, 17971/90 and 265672/90.

(3) The upper and lower layers are applied almost simultaneously using an extrusion coater having back-up rolls as disclosed in JP-A No. 174965/90.

In order to prevent electromagnetic characteristics loss or the like of magnetic recording media due to aggregation of ferromagnetic particles, coating solutions in the coating head should desirably be subjected to shearing by the method as disclosed in JP-A Nos. 95174/87 and 236968/89. In addition, coating solutions should have a viscosity satisfying the numerical range disclosed in JP-A No. 8471/91. Coating is followed by orientation to obtain magnetic recording media of the present invention. It is preferable to use a solenoid of 100 mT (1000 G) or more and a cobalt magnet of 200 mT (2000 G) or more with the facing sides being of the same polarity and to add a mild drying step before orientation to maximize orientability after drying. When the present invention is applied as a disk medium, an orientation method rather randomizing orientation is needed.

Suitable calender rolls include heat-resistant plastic rolls made of epoxy, polyimide, polyamide, polyimide-amide or the like. A series of metal rolls may also be used. The process temperature is preferably 70° C. or more, more preferably 80° C. or more. The linear pressure is preferably 200 kg/cm or more, more preferably 300 kg/cm or more. The friction coefficient of magnetic recording media of the present invention against SUS420J on the magnetic layer side and the opposite side is preferably 0.5 or less, more preferably 0.3 or less, and the surface specific resistance is preferably $10^4$–$10^{12}$ ohms/sq. The modulus of elasticity of the magnetic layer at 0.5% elongation in both running and width directions is preferably 0.98–19.6 GPa (100–2000 kg/mm$^2$), and the streng that break is preferably 0.98–29.4 GPa (1–30 kg/cm$^2$) The modulus of elasticity of magnetic recording media in both running and width directions is preferably 0.98–14.7 GPa (100–1500 kg/mm$^2$ the residual elongation is preferably 0.5% or less, and the thermal shrinkage at any temperature of 100° C. or below is preferably 1% or less, more preferably 0.5% or less, most preferably 0.1% or less. The glass transition temperature (i.e. the temperature at which the loss elastic modulus of dynamic viscoelasticity measured at 110 Hz is maximum) of the magnetic layer is preferably 50° C. or more but 120° C. or less, and that of the lower layer is preferably 0° C. to 100° C. The loss elastic modulus is preferably in the range of $1\times10^7$–$8\times10^8$ N/m$^2$ ($1\times10^8$–$8\times10^9$ dyne/cm$^2$), and the loss tangent is preferably 0.2 or less. Excessive loss tangents tend to cause adhesion failure.

The residual solvent content in the magnetic layer is preferably 100 mg/M$^2$ or less, more preferably 10 mg/m$^2$ or less. The void volume in both lower and magnetic layers is preferably 30% by volume or less, more preferably 20% by volume or less. The void volume is preferably as low as possible to attain high output, but may be preferably more than a specific value for some purposes. For example, higher void volumes are often preferred for better running durability in magnetic recording media for data recording in which repeated use weighs. Magnetic characteristics of magnetic recording media of the present invention are expressed as the squareness in the tape running direction of 0.70 or more, preferably 0.75 or more, more preferably 0.85 or more measured under a magnetic field of 500 mT (5 kOe).

The squarenesses in two directions perpendicular to the tape running direction are preferably 80% or less of the squareness in the running direction. The SFD (Switching Field Distribution) of the magnetic layer is preferably 0.6 or less.

The magnetic layer has a power spectral density of 0.2 nm or less at a wavelength of 1–5 μm and a power spectral density of 0.02–0.1 nm$^2$ at a wavelength of 0.5–1.0 μm in surface roughness spectra. The power spectral density is preferably as low as possible for better CNR, but should be maintained at 0.02–1.0 nm² in a wavelength range of 0.5–1.0 μm for better running durability.

In magnetic recording media of the present invention having a lower layer and an upper magnetic layer, these physical characteristics can obviously vary from lower to magnetic layers to meet the purpose. For example, the magnetic layer may have a relatively high modulus of elasticity to improve running durability while the lower layer may have a lower modulus of elasticity than that of the magnetic layer to improve the touch of magnetic recording media to heads. Physical characteristics of two or more magnetic layers can be chosen on the basis of known techniques relating to multilayer magnetic systems. For example, many inventions as disclosed in JP-B No. 2218/62 and JP-A No. 56228/83 propose to use an upper magnetic layer having an Hc higher than that of the lower layer. The present invention uses a thin magnetic layer to allow recording even if the magnetic layer has a further higher Hc.

The present disclosure relates to the subject matter contained in Japanese Patent Application No. 2000-94616, filed on Mar. 30, 2000, which is expressly incorporated herein by reference in its entirety.

[EXAMPLES]

The following examples further illustrate the present invention, in which the "parts" mean "parts by weight".

| | |
|---|---|
| (1) Lower layer | |
| Nonmagnetic powder α-Fe₂O₃ | 80 parts |
| Average major axis length: 0.1 μm | |
| Aspect ratio: 8.5 | |
| Specific surface area (BET): 56 m²/g | |
| PH: 8 | |
| Fe₂O₃ content: 90% or more | |
| DBP oil absorption: 27–38 ml/100 g | |
| Surface-treating agent: Al₂O₃. | |
| Carbon black | 20 parts |
| Average primary particle diameter: 16 nm | |
| DBP Oil absorption: 80 ml/100 g | |
| pH: 8.0 | |
| Specific surface area (BET) : 250 m²/g | |
| Volatile content: 1.5% | |
| Vinyl chloride copolymer | 10 parts |
| (MR-110 manufactured by Nippon Zeon, Co., Ltd.) | |
| Polyester-polyurethane resin | 5 parts |
| Molecular weight: 35,000 | |
| Neopentyl glycol/caprolactone polyol/MDI = | |
| 0.9/2.6/1 containing 1 × 10⁻⁴ eq/g of —SO₃Na | |
| group | |
| Butyl stearate | 1 parts |
| Stearic acid | 1 part |
| Methyl ethyl ketone | 100 parts |
| Cyclohexanone | 50 parts |
| Toluene | 50 parts |
| 2) Magnetic layer | |
| Ferromagnetic metal fine powder | 100 parts |
| Composition: Fe/Co = 75/25 | |
| Hc: 191 KA/m (2400 Oe) | |
| Specific surface area (BET) : 58 m²/g | |
| Crystallite size: 120 angstrom | |
| Surface-treating agent: Al₂O₃ | |
| Particle size (major axis length): 0.07 μm | |
| Aspect ratio: 6 | |
| σs: 108 A · cm²/kg (108 emu/g) | |
| Vinyl chloride copolymer | 5 parts |
| (MR-110 manufactured by Nippon Zeon, Co., Ltd.) | |
| Polyester-polyurethane resin | 3 parts |
| Neopentyl glycol/caprolactone polyol/MDI = | |
| 0.9/2.6/1 containing 1 × 10⁻⁴ eq/g of —SO₃Na | |

-continued

| | |
|---|---|
| group | |
| α-Alumina(particle size 0.1 μm) | 5 parts |
| Carbon black (particle size 0.1 μm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

For each of the above two coatings, various components were kneaded with a continuous kneader and then dispersed with a sand mill. The resulting dispersion was combined with a polyisocyanate in an amount of 3 parts for the coating solution for the lower layer or 1 part for the coating solution for the upper layer and further combined with 40 parts of a mixed solvent of methyl ethyl ketone and cyclohexanone, and the mixed solution was passed through a filter having an average pore diameter of 1 μm to prepare coating solutions for forming lower and upper magnetic layers. Then, the resulting coating solutions were applied by simultaneous multi layer coating to form a lower layer into a dried thickness of 1.2 μm immediately followed by a magnetic layer into a thickness of 0.05 μm on a polyethylene naphthalate substrate having a thickness of 5.5 μm and Young's moduli in MD and TD of 5.88 and 8.82 GPa (600 and 900 Kg/m³), respectively. Both layers still wet were oriented with a cobalt magnet having a magnetic force of 300 mT (3000 G) and a solenoid having a magnetic force of 150 mT (1500 G) and dried, and then passed through a 7-stage calender totally consisting of metal rolls at a temperature of 90° C. and slit in a width of 8 mm to prepare a 8 mm-videotape.

Evaluation Methods (1) The C/N was determined with a drum tester using an MIG head having a Bs of 1.2 T and a gap length of 0.22 μm for reproducing and a shield MR head having a shield gap of 0.2 μm and an MR membrane Bs of 1.2 T for reproducing.

Signals at a single frequency of 21 MHz were noted at a head/medium relative speed of 10.5 m/sec during recording/reproducing and the reproducing spectrum was observed with a spectrum analyzer manufactured by Shibasoku Co., Ltd. The C/N represents the ratio of carrier output at 21 MHz to noise at 19 MHz.

(2) Thickness determination

Each sample tape was cut out along the longitudinal direction with a diamond cutter into a thickness of approximately 0.1 μm and then observed and photographed with a transmission electron microscope at a magnification of 100, 000x. Lines were drawn between the surface of the magnetic layer and the magnetic layer/lower layer interface on the microphotograph and the lengths of the lines were measured with an image processor IBAS2 manufactured by Zeiss Co., Ltd. For 21cm-long photographs, 85 to 300 measurements were made to calculate the mean value d and the standard deviation σ.

(3) Ra determination

The centerline average roughness on the surface of the magnetic layer was measured with TOPO-3D from WYKO.

(4) The SQ and Hc were measured with a VSM under an external magnetic field of 10 Koe.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Upper magnetic layer | Thickness | [μm] | 0.05 | 0.03 | 0.08 | 0.05 | 0.05 | 0.05 | 0.05 |
|  | Magnetic particle size | [μm] | 0.07 | 0.06 | 0.095 | 0.07 | 0.07 | 0.07 | 0.07 |
|  | Aspect ratio |  | 6 | 5.5 | 7 | 6 | 6 | 6 | 6 |
|  | σs | [A.m²/kg] | 108 | 93 | 118 | 108 | 108 | 108 | 108 |
|  | Total amount of binders | [Parts] | 9 | 9 | 9 | 9 | 9 | 25 | 16 |
|  | Hc | [KA/m] | 191 | 171 | 193 | 191 | 191 | 191 | 191 |
|  | Magnetic material volume | [nm³] | 6700 | 5000 | 12500 | 6700 | 6700 | 6700 | 6700 |
|  | Volume packing density | [%] | 41 | 43 | 38 | 41 | 40 | 28 | 34 |
| Lower layer powder | Type |  | Acicular hematite | Acicular hematite | Acicular hematite | Acicular hematite | Acicular hematite | Acicular hematite | Acicular hematite |
|  | Major axis length | [μm] | 0.1 | 0.1 | 0.1 | 0.17 | 0.06 | 0.1 | 0.1 |
|  | Aspect ratio |  | 8.5 | 8.5 | 8.5 | 10 | 7 | 8.5 | 8.5 |
|  | Upper AR/lower AR |  | 0.71 | 0.65 | 0.82 | 0.6 | 0.86 | 0.71 | 0.71 |
|  | Granulated powder type |  | Carbon | Carbon | Carbon | Carbon | Carbon | Carbon | Carbon |
|  | True specific gravity |  | 1.6 | 1.6 | 1.6 | 1.6 | 1.6 | 1.6 | 1.6 |
|  | Average particle size | [nm] | 18 | 18 | 18 | 18 | 18 | 18 | 18 |
|  | Content | [Parts] | 25 | 25 | 25 | 25 | 25 | 25 | 25 |
| Evaluation results | Thickness SD σ | [μm] | 0.012 | 0.01 | 0.02 | 0.01 | 0.02 | 0.022 | 0.022 |
|  | Magnetic layer Hc | [KA/m] | 197 | 174 | 196 | 197 | 197 | 192 | 195 |
|  | Magnetic layer SQ |  | 0.87 | 0.85 | 0.89 | 0.88 | 0.88 | 0.85 | 0.86 |
|  | Ra | [nm] | 2.1 | 2.1 | 2.4 | 3.2 | 2.2 | 2.8 | 2.6 |
|  | Reproducing output | [dB] | −1.1 | −2 | 0 | −0.8 | −0.8 | −2.1 | −1.5 |
|  | CNR | [dB] | 6.8 | 4.3 | 5.3 | 6.1 | 5.2 | 3.8 | 5.8 |

|  |  |  | Ex. 8 | Ex. 9 | Ex. 10 | Com. ex. 1 | Com. ex. 2 |
|---|---|---|---|---|---|---|---|
| Upper magnetic layer | Thickness | [μm] | 0.05 | 0.05 | 0.05 | 0.1 | 0.13 |
|  | Magnetic particle size | μm] | 0.07 | 0.07 | 0.07 | 0.07 | 0.12 |
|  | Aspect ratio |  | 6 | 6 | 6 | 6 | 9 |
|  | σs | [A.m²/kg] | 108 | 108 | 108 | 140 | 153 |
|  | Total amount of binders | [Parts] | 9 | 9 | 9 | 25 | 25 |
|  | Hc | [KA/m] | 191 | 191 | 191 | 159 | 159 |
|  | Magnetic material volume | [nm³] | 6700 | 6700 | 6700 | 16500 | 27000 |
|  | Volume packing density | [%] | 41 | 41 | 41 | 28 | 29 |
| Lower layer powder | Type |  | Acicular hematite | Acicular hematite | Acicular hematite | Acicular hematite | Granular hematite |
|  | Major axis length | [μm] | 0.1 | 0.1 | 0.1 | 0.16 | 0.24 |
|  | Aspect ratio |  | 8.5 | 8.5 | 8.5 | 8 | 8 |
|  | Upper AR/lower AR |  | 0.71 | 0.71 | 0.71 | 0.75 | 1.13 |
|  | Granulated powder type |  | TiO₂ | Carbon | Carbon | Carbon | none |
|  | True specific gravity |  | 4.2 | 1.6 | 1.6 | 1.6 |  |
|  | Average particle size |  | 35 | 18 | 18 | 15 |  |
|  | Content |  | 25 | 12 | 35 | 10 |  |
| Evaluation results | Thickness SD σ | [μm] | 0.015 | 0.012 | 0.023 | 0.03 | 0.08 |
|  | Magnetic layer Hc | [KA/m] | 197 | 197 | 197 | 163 | 160 |
|  | Magnetic layer SQ |  | 0.86 | 0.86 | 0.86 | 0.85 | 0.87 |
|  | Ra | [nm] | 3.1 | 3 | 4 | 2.5 | 3.6 |
|  | Reproducing output | [dB] | −1.2 | −1.5 | −2.3 | 0 | 0 |
|  | CNR | [dB] | 5.5 | 6.3 | 3.4 | 0 | −2.5 |

Explanation of Examples and Comparative examples

Electromagnetic characteristics were evaluated on the basis of Comparative example 1 (0 dB) corresponding to Example 1 of JP-A No. 102037/96.

Effects of the invention were evaluated on the basis of the improvement of C/N by 2 dB or more (which generally influences the error rate by one order of magnitude per 2 dB). Outputs in most examples are lower than that of Comparative example 1. However, outputs as low as about −10 dB are acceptable, but an increase in C/N is rather important because the absolute values of outputs with an MR head are high (+20 dB as compared with those obtained with conventional inductive heads). Therefore, outputs are reference data.

Example 1 is a typical example satisfying all the conditions as defined in claims 1–4. C/N is improved by 6.8 dB as compared with Comparative example 1.

Example 2 uses a thinner magnetic layer containing a magnetic material having a shorter major axis length and a lower σs as compared with Example 1 (i.e. the lowest magnetic energy). The Hc also decreases along with the shorter major axis length and the smaller σs. However, a sufficiently advantageous C/N was obtained over Comparative example 1.

Example 3 uses a thicker magnetic layer containing a magnetic material having a longer major axis length and a higher σs as compared with Example 1 (i.e. the highest magnetic energy). Output is improved, but C/N begins to decrease because noise components increase as the MR head begins to be saturated.

Example 4 is an example where the major axis length and aspect ratio of the powder in the lower layer are increased, with the result that the surface roughness is slightly higher and the C/N is slightly lower as compared with Example 1.

Example 5 is an example where the major axis length and aspect ratio of the powder in the lower layer are decreased, with the result that the interface variation (σ) increases and the C/N decreases as compared with Example 1.

In Examples 6 and 7, the amount of binders is increased to lower the volume packing density. The C/N ratios are relatively low.

In Example 8, the granulated powder in the lower layer consists of TiO$_2$ having an average particle diameter of 35 nm.

In Example 9, the amount of carbon in the lower layer is low. The moldability by calendering is low, resulting in a relatively low C/N.

In Example 10, the amount of carbon in the lower layer is high. The dispersibility in the lower layer is poor, resulting in a high surface roughness, a high interface variation and a relatively low C/N.

Comparative example 2 is an example which does not satisfy any conditions as claimed herein.

It is shown that magnetic recording media of the present invention exhibit a high C/N in high-density magnetic recording using an MR head for reproducing. However, the invention of JP-A No. 102037/96 using an acicular ferromagnetic alloy powder having a relatively similar range but a σs of 130–1700 A.m$^2$/kg (130–170 emu/g) cannot show a high C/N in high-density magnetic recording using an MR head for reproducing as shown in Comparative example 1 as compared with the present invention.

According to the present invention, a particulate magnetic recording medium showing a high C/N in high-density magnetic recording (especially using an MR head for reproducing) can be provided.

What is claimed is:

1. A magnetic recording medium comprising a lower layer containing a nonmagnetic powder and a binder and a magnetic layer containing a ferromagnetic powder and a binder provided on a nonmagnetic flexible substrate in this order wherein said magnetic layer has an average thickness d in a range of from 0.01 to 0.1 μm, said ferromagnetic powder contained in said magnetic layer is an acicular ferromagnetic alloy powder having an average major axis length equal to or less than 0.1 μm and a saturation magnetization equal to or less than 120 A.m$^2$/kg, said nonmagnetic powder contained in said lower layer is an acicular inorganic powder having an average major axis length equal to or less than 0.15 μm, and said ferromagnetic powder has an aspect ratio equal to or smaller than the aspect ratio of said acicular inorganic powder.

2. The magnetic recording medium according to claim 1, wherein said ferromagnetic alloy powder has an average particle volume in a range of from 1500 to 15000 nm$^3$ and a coercivity equal to or more than 167 KA/m.

3. The magnetic recording medium according to claim 2, wherein said ferromagnetic alloy powder has an average particle volume in a range of from 2000 to 12000 nm$^3$.

4. The magnetic recording medium according to claim 2, wherein said ferromagnetic alloy powder has an average particle volume in a range of from 3000 to 10000 nm$^3$.

5. The magnetic recording medium according to claim 2, wherein said ferromagnetic alloy powder has a coercivity in a range of from 175 to 279 KA/m.

6. The magnetic recording medium according to claim 1, wherein said ferromagnetic powder in said magnetic layer has a volume packing density equal to or more than 30%.

7. The magnetic recording medium according to claim 6, wherein said ferromagnetic powder in said magnetic layer has a volume packing density equal to or more than 35%.

8. The magnetic recording medium according to claim 6, wherein said ferromagnetic powder in said magnetic layer has a volume packing density equal to or more than 38%.

9. The magnetic recording medium according to claim 1, wherein said acicular ferromagnetic powder has a saturation magnetization in a range of from 80 to 120 A.m$^2$/kg.

10. The magnetic recording medium according to claim 1, wherein said acicular ferromagnetic powder has a saturation magnetization in a range of from 90 to 120 A.m$^2$/kg.

11. The magnetic recording medium according to claim 1, wherein said acicular ferromagnetic powder has an average major axis length in a range of from 0.03 to 0.08 μm.

12. The magnetic recording medium according to claim 1, wherein said acicular ferromagnetic powder has a minor axis length in a range of from 0.005 to 0.02 μm.

13. The magnetic recording medium according to claim 1, wherein said acicular ferromagnetic powder has a minor axis length in a range of from 0.008 to 0.015 μm.

14. The magnetic recording medium according to claim 1, wherein said acicular ferromagnetic powder has an aspect ratio in a range of from 3 to 15.

15. The magnetic recording medium according to claim 1, wherein said acicular ferromagnetic powder has an aspect ratio in a range of from 5 to 10.

16. The magnetic recording medium according to claim 1, wherein said lower layer contains a granulated powder having an average particle size equal to or less than 50 nm and a true specific gravity equal to or less than 5 in an amount in a range of from 10 to 30 parts per 100 parts of said acicular inorganic powder.

* * * * *